Feb. 24, 1970  S. PEER  3,497,235
MOTOR VEHICLE SUSPENSION
Filed Oct. 11, 1967  4 Sheets-Sheet 2

STEPHEN PEER
INVENTOR

BY John R. Faulkner
Clifford L. Sadler
ATTORNEY

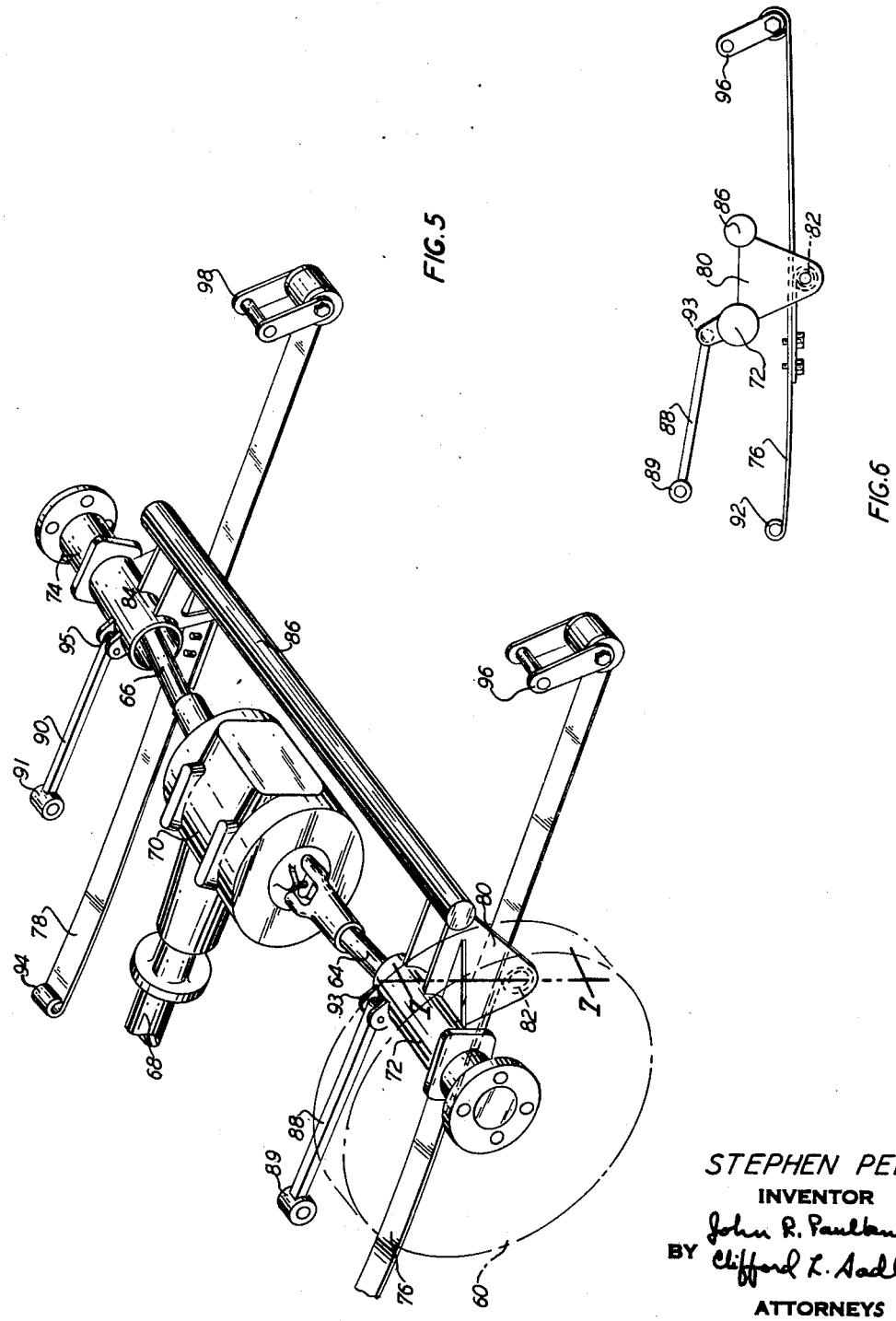

United States Patent Office 3,497,235
Patented Feb. 24, 1970

3,497,235
MOTOR VEHICLE SUSPENSION
Stephen Peer, Ilford, England, assignor to Ford Motor Company, Dearborn, Mich., a corporation of Delaware
Continuation-in-part of application Ser. No. 523,658, Jan. 28, 1966. This application Oct. 11, 1967, Ser. No. 683,056
Claims priority, application Great Britain, May 3, 1967, 20,424/67
Int. Cl. B60g 11/12
U.S. Cl. 280—124                                      12 Claims

ABSTRACT OF THE DISCLOSURE

A vehicle suspension system having, in its presently preferred embodiment, a pair of leaf springs pivotally connected to the vehicle chassis and to the axle. The suspension has lateral resiliency and the arms are splayed outwardly and forwardly to provide side thrust understeer.

BACKGROUND OF THE INVENTION

This application is a continuation-in-part of my co-pending application Ser. No. 523,658, filed Jan. 28, 1966 now abandoned and entitled "Motor Vehicle Suspension."

The present invention relates generally to motor vehicle suspension systems, and more particularly to an improvement in suspension systems having longitudinal leaf springs.

The commonly used Hotchkiss type leaf suspension system has many advantages. For an example, it provides a simple and economical suspension arrangement. Such a suspension, however, has certain design limitations. It is difficult to provide the geometry features with a Hotchkiss suspension that are possible with other suspension systems.

In view of the state of the art relating to leaf type suspension systems for motor vehicles, it is the principal object of this invention to provide an improved suspension system in which a leaf type spring is used in connection with a linkage system for providing side thrust understeer and other desirable geometry features.

BRIEF SUMMARY OF THE INVENTION

According to the present invention, a rigid rear axle is connected to the sprung mass of the vehicle by linkage so that a lateral force, such as a centrifugal force occurring during cornering, causes the sprung mass to move laterally relative to the wheels and axle. The linkage constrains the axle so that the lateral movement results in the axle rotating about a vertical axis relative to the sprung mass which, in turn, causes a change in the steer angle of the wheels. This arrangement enables the steering characteristics of the suspension to be accurately controlled since the steer angle of the axle is substantially independent of the load carried by the vehicle and depends almost solely upon lateral cornering forces imposed on the axle, unlike roll steer caused by body roll during cornering.

The concept of the present invention may be incorporated in a variety of structures. In one preferred embodiment, a vehicle is provided with a rigid driving axle. A pair of longitudinally extending leaf springs are connected to the vehicle chassis by pivots and shackles in the usual fashion. The rigid axle is connected to the leaf springs by pivotal connections. A pair of suspension arms are provided and have their forward ends pivotally connected to the vehicle chassis and their rear ends pivotally connected to the rigid axle. The arms are arranged in a diverging fashion with their forward ends spaced farther apart than their rearward ends. This diverging arrangement of the upper arms provides side thrust understeer.

The concept of the invention is also adaptable to a suspension of the De Dion type having a sprung differential and a dead axle.

BRIEF DESCRIPTION OF THE DRAWINGS

The many objects and advantages of the present invention will become readily apparent upon consideration of the following discussion and the accompanying drawings, in which:

FIG. 5 is a perspective view of an alternate embodiment of the invention incorporated in a vehicle construction;

FIG. 6 is a side elevational view of the suspension of FIG. 5;

DETAILED DESCRIPTION OF THE INVENTION

Figure 1:
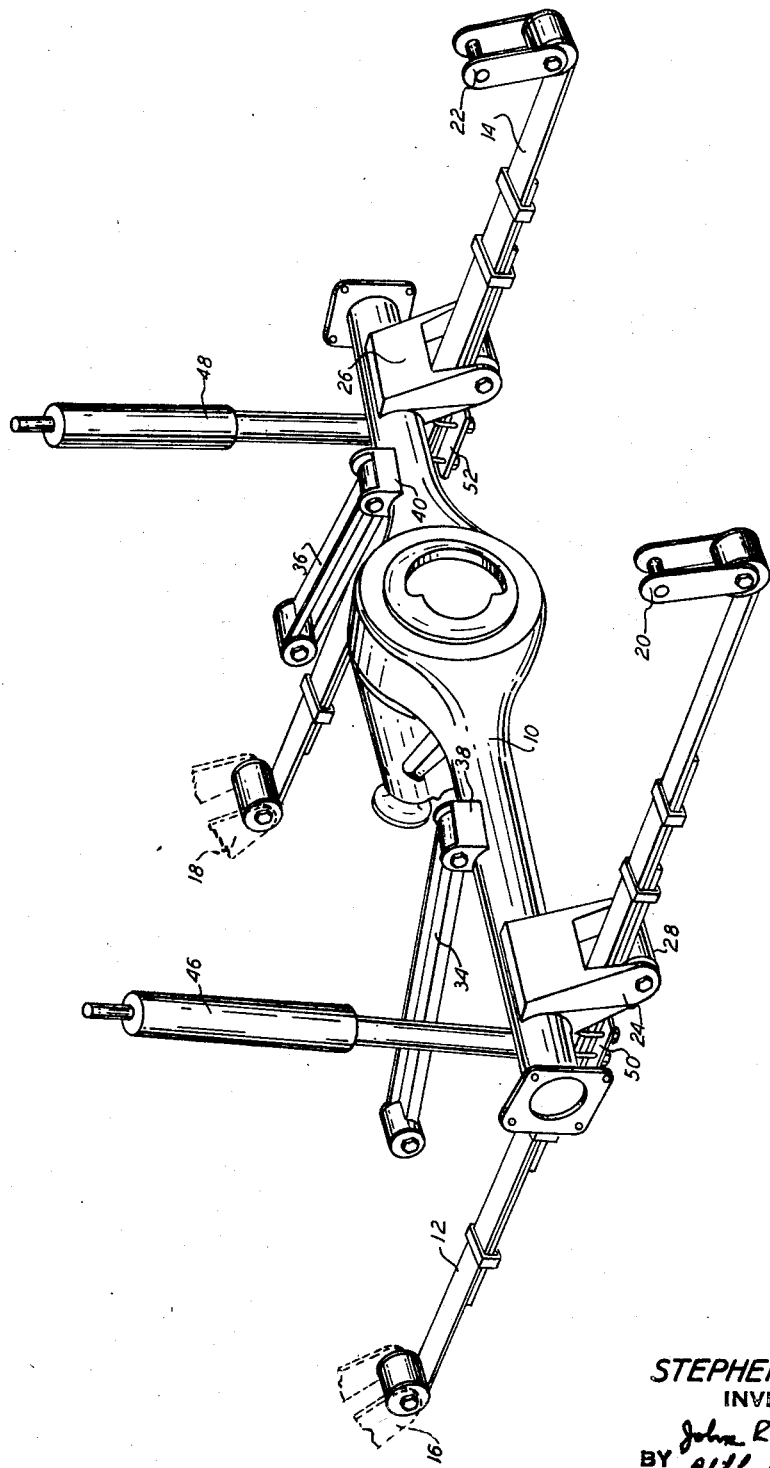
FIG. 1 is a perspective view of a vehicle suspension system incorporating the present invention.
Figure 2:
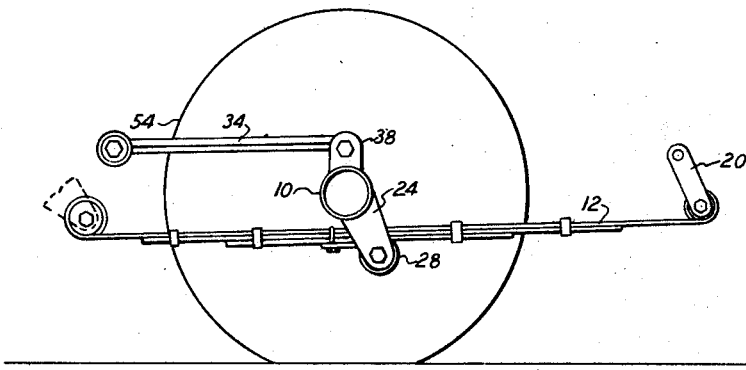
FIG. 2 is a schematic side elevational view of the suspension of FIG. 1.

Referring now to the drawings for a more complete understanding of the invention, FIG. 1 illustrates a rear suspension system for a motor vehicle in which an axle housing 10 extends from one side to the other side of the vehicle. Left and right longitudinally extending leaf springs 12 and 14 are connected to the chassis of the vehicle. The forward ends of springs 12 and 14 are pivotally connected to frame mounted brackets 16 and 18 by conventional pivot structure such as resilient bushings. Shackle assemblies 20 and 22 connect the rear ends of the springs 12 and 14 with the vehicle frame.

Figure 3:
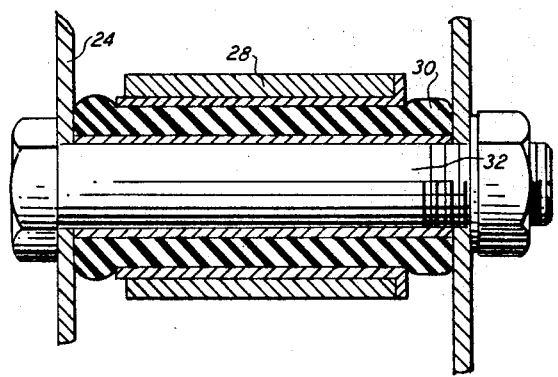
FIG. 3 is a sectional view showing the connection between the axle and the leaf spring.

Identical bracket assemblies 24 and 26 are rigidly secured near the outer ends of the axle housing 10 and extend downwardly and rearwardly therefrom. The construction shown in FIG. 3 is of the connection between the bracket 24 and the leaf spring 12. The connection between bracket 26 and leaf spring 14 is identical. Spring 12 is a laminated assembly of single spring leaves. The lowermost lamination terminates in a spring eye 28 in the vicinity of the bracket 24. A resilient bushing assembly 30 is inserted in the spring eye 28 and is connected to the bracket 24 by a threaded bolt 32.

A pair of suspension arms 34 and 36 are pivotally connected at their rear ends to frame secured brackets 38 and 40. The suspension arms 34 and 36 extend forwardly from the axle 10 and in an outward direction so that the forward ends are spaced farther apart than the rearward ends. The forward ends of the arms 34 and 36 are pivotally connected to chassis frame brackets which are illustrated schematically in FIG. 4 and identified by the reference numerals 42 and 44. The pivotal connections at the front and rear ends of the suspension arms 34 and 36 may employ resilient bushings in order to provide desirable flexibility.

A pair of telescopic shock absorbers 46 and 48 have their lower ends secured to the spring clamps 50 and 52, respectively. The upper ends of the shock absorbers 46 and 48 are connected to the vehicle chassis.

It is to be noted that sufficient flexibility is built into the suspension system to permit the axle 10 to move laterally when subjected to a force. This flexibility occurs at the pivots at the ends of the suspension arms 34 and 36 and also in the bushing 30 connecting the brackets 24, 26 with the springs 12, 14. The springs 12 and 14, of course, are capable of some lateral deflection as well as the pivotal and shackle connections at the ends of the springs.

OPERATION

In a conventional Hotchkiss suspension, the axle is secured directly to the springs so that there is substantially no possibility of relative lateral movement between the axle and the springs. The fronts of the leaf springs are usually positioned at a height relative to the axle so that upon cornering the axle will cant to produce a steering effect. The steering effect occurs in response to body roll and, therefore, it is known as "roll steer." Generally speaking, if the front ends of the springs are positioned above the axle then an oversteer effect will occur as a result of body roll, and if the front ends are positioned below the axle, an understeer effect will be obtained. A neutral steering characteristic will be obtained by having the fronts of the springs at the same level as the axle. The relative heights mentioned are those prevailing when the vehicle is carrying a load, for example, just a driver. Consequently, if the load is increased the springs will deflect a greater amount and the relative height will be changed and, therefore, so will the steering characteristic. Thus, it follows that the vehicle will have different roll steer characteristics for different load conditions.

The present invention is concerned with overcoming this difficulty by constructing the suspension so that it provides a substantially constant steering characteristic irrespective of load.

Figure 4:
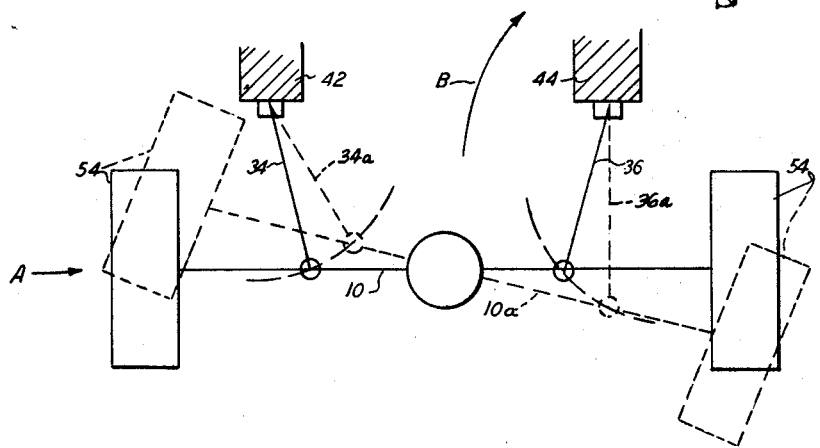
FIG. 4 is a schematic plan view of the suspension of FIG. 1 with the deflected position of the components resulting from a side force shown in dotted lines.

In FIG. 4, consider the effect of a cornering force applied to the axle 10 through the wheel and tire 54 in the direction of the arrow A. For convenience, it will be assumed that the vehicle body remains stationary and that the axle 10 moves relative to the body during cornering, although, of course, in practice it is the body which moves under centrifugal force and the axle is held stationary, in a lateral direction, by the tires gripping the road. The force A would be the resultant of a centrifugal force caused by a right-hand turn (arrow B).

The resilient bushings connecting the brackets 24, 26 with the springs 12, 14 allow the axle 10 to move laterally relative to the vehicle chassis in the direction of the arrow A. Since the axle 10 is connected to vehicle body by the suspension arms 34, 36 these arms control the path of the movement of the axle 10. The arms 34, 36 are inclined forwardly and outwardly in the plan view and the bushings at either end of the two arms 34, 36 allow limited rotation to the positions 34a and 36a shown in dotted lines. Consequently, any lateral displacement of the axle 10 relative to the vehicle body in the direction of the arrow A causes the suspension arms 34, 36 to rotate which, in turn, causes the axle 10 to rotate or cant about a vertical axis into the dotted-line position indicated by reference numeral 10a. A change in the steer angle of the wheels is thus effected. In this case, the steer angle change results in an understeer characteristic since the vehicle is turning in a clockwise direction as viewed in FIG. 4.

This suspension is preferably designed so that there is negligible roll steer effect, and consequently, the steer effect is almost entirely due to relative lateral movement between the axle and the body. Since this movement depends only on the cornering force, and not upon the load and consequent spring deflection, the suspension can be designed to have a more or less constant steer characteristic independent of load.

THE EMBODIMENT OF FIGURE 5

An alternate embodiment of the present invention is illustrated in FIGS. 5, 6, 7 and 8. In these views, a motor vehicle has two rear wheels 60 and 62 which are driven by left and right half shafts 64 and 66. The half shafts receive driving torque from a drive shaft 68 through a differential 70. The differential 70 is secured to the sprung mass or body of the vehicle. The wheels 60, 62 are rotatably carried by left and right wheel carriers 72 and 74.

Figure 7:
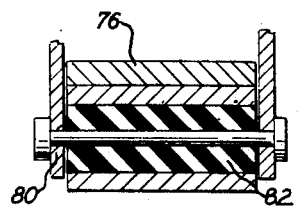
FIG. 7 is a cross sectional view taken along section line 7—7 of FIG. 5.

Each of the wheel carriers 72 and 74 is connected to an intermediate part of longitudinally extending leaf spings 76 and 78 through a resilient bushing such as shown in FIG. 7. The resilient bushing for the left side comprises a trunnion 80 which incorporates a rubber bush 82. A trunnion 84 and similar bushing construction is provided for the right side. The trunnions 80, 84 are formed as extensions of the wheel carriers 72, 74 and the pivotal connections provided by the rubber bushings are adapted to isolate the springs 76 and 78 from torque reactions.

The wheel carriers 72, 74 are interconnected by a rigid dead axle 86 as in a De Dion suspension. Each wheel carrier 72, 74 is also connected to the sprung mass of the vehicle by a trailing arm, such as suspension arms 88 and 90. The arms 88 and 90 are pivotally connected at their forward ends 89 and 91 to the sprung mass or vehicle body. The rear ends 93 and 95 of the arms 88, 90 are pivotally connected to brackets welded to the wheel carriers 72 and 74.

The leaf springs 76 and 78 are pivotally connected at their leading ends to the sprung mass in a conventional fashion by bolts that pass through rubber bushings located in the eyes 92 and 94 at the forward end of the springs. The trailing ends of the leaf springs 76, 78 are pivotally connected to the sprung mass by shackles 96 and 98.

Each of the two half shafts 64, 66 incorporates a splined joint (not shown) which allows the half shaft length to vary. These splined joints incorporate ball or roller bearings to reduce frictional forces that tend to lock the joint solid when it is transmitting torque.

As explained in connection with the embodiment of FIG. 1, the height of the front ends 92 and 94 of the springs 76 and 78 may be positioned below the level of the wheel centers to provide understeer responsive to body roll. Unfortunately, the relative height of the spring ends 92, 94 and the wheel centers is dependent upon vehicle loading. A leaf spring suspension designed to provide roll understeer under normal circumstances may have oversteer characteristics when it is heavily loaded.

The present invention is concerned with overcoming this difficulty by constructing the suspension so that it can be designed to give a substantially constant steering characteristic irrespective of load.

Figure 8:
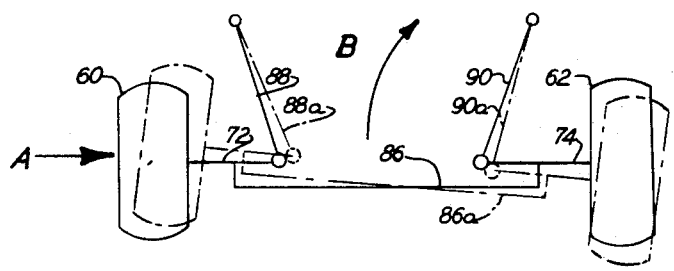
FIG. 8 is a diagrammatic plan view of the suspension of FIG. 5 showing the effects of sidethrust understeer.

In FIG. 8 consider a cornering force resulting from a right-hand turn as indicated by the arrow B and applied to the axle 86 through the wheels 60, 62 in the direction of the arrow A. For convenience it will be assumed that the vehicle body remains stationary and that the axle 86 moves relatively to the body during cornering, although of course in practice it is the body which would move under centrifugal force and the axle 86 would be held stationary, in a lateral direction, by the tires gripping the road. The force A is the resultant of a centrifugal force caused by a right-hand turn (arrow B).

The resilient rubber bushes 82 between the wheel carriers 72, 74 and the springs 76, 78 allow the axle 86 to be moved laterally relatively to the vehicle body in the direction of the arrow A. However, since the axle 86 is connected to the body by the suspension arms 88 and 90, these arms control the path of movement of the axle 86. The arms 88, 90 are inclined inwardly and rearwardly in plan view, toward the center of the axle 86. The rubber bushings at the ends 89, 91, 93 and 95 allow the arms 88, 90 to rotate laterally a limited amount to the positions 88a and 90a shown in broken lines. Consequently, any lateral displacement of the axle 86 relatively to the vehicle body in the direction of the arrow A causes the arms 88, 90 to rotate as shown which, in turn, causes the axle 86 itself to rotate about a vertical axis into the position 86a shown in broken lines. A change in the steer angle of the wheels 60 and 62 is thus effected.

In this case the steer angle change results in an understeering characteristic since the car is turning in a clockwise direction, as viewed in FIG. 8 and indicated by curved arrow B.

The suspension is preferably designed so that there is negligible roll steer effect and consequently, the steer effect is almost entirely due to relative lateral movement between the axle 86 and the body. Since this movement depends only on the cornering force and not upon the consequent spring deflection, the suspension can be designed to have a more or less constant steer characteristic which is independent of load.

As used in the appended claims, the term "body" is intended to be all inclusive of the sprung components of the vehicle and includes the frame.

The foregoing description presents the presently preferred embodiment of this invention. Modifications and alterations may occur to those skilled in the art that will come within the scope and spirit of the following claims.

I claim:

1. A vehicle suspension system including a body portion, a rigid wheel support means extending generally transversely of said body portion, a wheel rotatably supported at each of the outer ends of said means, a pair of leaf springs connected to said body portion, pivot means connecting each of said leaf springs to said wheel support means, a pair of mutually independent suspension arms, said arms each having one of its ends pivotally connected to said body portion and the other of its ends pivotally connected to said wheel support means, said suspension arms being inclined with respect to each other in the plan view whereby lateral movement of said body portion with respect to said wheel support means will cause a canting of said wheels and said wheel support means.

2. A vehicle suspension system as set forth in claim 1 and said pivot means having a pivot axis generally parallel to the axis of rotation of said wheels.

3. A vehicle suspension system as set forth in claim 1 and including a differential gear unit supported by said body portion, articulated shaft means connecting said gear unit with said wheels.

4. A vehicle suspension system as set forth in claim 1 and including a differential gear unit supported by said body portion, articulated shaft means connecting said gear unit with said wheels, said pivot means having a pivot axis generally parallel to the axis of rotation of said wheels.

5. A vehicle suspension system as set forth in claim 1 and having said suspension arms inclined in a forwardly and outwardly direction whereby said lateral movement will cause a canting of said wheels and said wheel support means in the direction of understeer.

6. A vehicle suspension system as set forth in claim 1 and having said suspension arms inclined in a forwardly and outwardly direction whereby said lateral movement will cause a canting of said wheels and said wheel support means in the direction of understeer, said pivot means having a pivot axis generally parallel to the axis of rotation of said wheels.

7. A vehicle suspension system as set forth in claim 1 and having said suspension arms inclined in a forwardly and outwardly direction whereby said lateral movement will cause a canting of said wheels and said wheel support means in the direction of understeer, a differential gear unit supported by said body portion, articulated shaft means connecting said gear unit with said wheels.

8. A vehicle suspension system as set forth in claim 1 and having said suspension arms inclined in a forwardly and outwardly direction whereby said lateral movement will cause a canting of said wheels and said wheel support means in the direction of understeer, a differential gear unit supported by said body portion, articulated shaft means connecting said gear unit with said wheels, pivot means connecting each of said leaf springs to said wheel support means, said pivot means having a pivot axis generally parallel to the axis of rotation of said wheels.

9. A vehicle suspension system including a body portion, a rigid wheel support means extending generally transversely of said body portion, a wheel rotatably supported at each of the outer ends of said means, a pair of leaf springs connected to said body portion, said leaf springs being connected to said wheel support means by resilient means, a pair of mutually independent suspension arms, said pair of arms being connected at their rearward ends to said wheel support means by resilient pivot means, said pair of suspension arms being connected at their forward ends to said body portion by resilient pivot means, said suspension arms being inclined in a forwardly and outwardly direction with respect to each other in the plan view whereby lateral movement of said body portion with respect to said wheel support means will cause a canting of said wheels and said wheel support means in the direction of understeer.

10. A vehicle suspension system as set forth in claim 9 and having bracket means secured to said wheel support means and extending downwardly and rearwardly therefrom, resilient pivot means connecting each of said leaf springs to said bracket means.

11. A vehicle suspension system including a body portion, a rigid wheel support means extending generally transversely of said body portion, a wheel rotatably supported at each of the outer ends of said means, a pair of leaf springs connected to said body portion, bracket means secured to said wheel support means, resilient bushing means connecting each of said leaf springs to said bracket means, the said resilient bushing means connecting said leaf springs to said bracket means having a lateral axis of deflection, said axis being vertically spaced from the pivot axis of the connection between said suspension arms and said wheel support means, a pair of mutually independent suspension arms, said pair of arms being connected at their rearward ends to said wheel support means by resilient means, said pair of suspension arms being connected at their forward ends to said body portion by resilient means, said suspension arms being inclined with respect to each other in the plan view whereby lateral movement of said body portion with respect to said wheel support means will cause a canting of said wheels and said wheel support means.

12. A vehicle suspension system as set forth in claim 11 and having said leaf springs each being connected at their forward ends to said body portion by resilient bushings, said leaf springs being connected at their rearward ends to said body portion by shackle devices.

References Cited

UNITED STATES PATENTS 2,753,007   7/1956   Read _____ 280—124 X
3,245,492   4/1966   Herr _____ 280—124

PHILIP GOODMAN, Primary Examiner

U.S. Cl. X.R.

267—19